Patented Dec. 16, 1947

2,432,607

UNITED STATES PATENT OFFICE 2,432,607

PARTIAL LAURIC ACID ESTERS OF POLY-HYDRIC ALCOHOLS IN INSECTICIDES

Kenneth R. Brown, Kennett Square, Pa., assignor to Atlas Powder Company, Wilmington, Del., a corporation of Delaware No Drawing. Application January 15, 1941, Serial No. 374,474

7 Claims. (Cl. 167—24)

The present invention relates to parasiticides.

An object of the invention is to provide a parasiticide comprising two types of materials which together exhibit synergistic killing power and one of which further acts as a highly efficient spreader and wetting agent for the combination.

Another object is to provide a concentrate comprising a toxic agent of vegetable origin and a partial ester of a polyhydroxylic material which has the further property of dispersing the combination readily in water to form a dispersion suitable for spray application.

The above and other objects will become apparent from the following specification and claims.

The present application is in part a continuation of my application Serial Number 310,351 now Patent No. 2,318,920 granted May 11, 1943, which claims a novel insecticidal ingredient.

Insecticides must not only have the ability to kill insects but must be safe to apply to infested plants or animals, must be economically practical, and must be capable of ready application. The insecticides of vegetable origin such as rotenone-containing products, pyrethrum, nicotine, and nicotine compounds, ricin, cashew nut oil and derivatives thereof, and the like, have good toxicity, and little tendency to injure plants. Rotenone-containing products and pyrethrum have a further advantage in their lack of toxicity to warm-blooded animals if they should happen to be eaten by them.

All of the vegetable parasiticides are, however, relatively expensive and do not disperse well in water or spread well on plants, insects or higher animals. Both insects and plants are provided by nature with water resistant coverings of a waxy or oily nature which render them difficult to wet efficiently with an aqueous parasiticide and without efficient wetting there can be no useful distribution of the toxic material. From the standpoint of economy, particularly in agricultural insect control, it is highly desirable to use water as the medium for distributing the toxic material. Water also has no ill effect on the plant whereas some of the materials that wet insects and plants more readily than water have detrimental effects.

To give the necessary wetting and spreading characteristics, it is, therefore, usual to include in a parasiticidal spray some type of wetting and spreading agent such as soap, sulphonated oil, soy bean flour or the like, materials which have little or no toxicity in themselves and are largely inert materials in the sprays.

Furthermore, the parasiticidal materials ordinarily incorporated into sprays are relatively insoluble in water and difficult to disperse completely. This fact renders it difficult to prepare a homogeneous dispersion suitable for spraying.

I have found a class of materials which can be combined with the parasiticides of vegetable origin either to form a water-dispersible concentrate, or to form a water dispersion by combining them at the time of preparing the aqueous spray. These materials increase the toxicity of the vegetable parasiticide to a marked and unexpected degree. The combinations exhibit synergism to a striking extent and permit great dilution of the expensive vegetable parasiticide. Aqueous dispersions containing the combinations can be prepared very readily and when applied show excellent wetting and spreading characteristics.

The parasiticides of this invention are useful against not only soft bodied sucking insects but also against many other varieties including many chewing insects.

The materials which I combine with vegetable parasiticides are water-dispersible partial esters of aliphatic, low molecular weight polyhydroxylic materials and lauric acid or coconut oil fatty acids. By "low molecular weight" as used herein I intend to exclude polyhydroxylic materials of molecular weights higher than those of oligosaccharides. Among the polyhydroxylic materials may be mentioned ethylene glycol, glycerol, diethylene glycol, other polyethylene glycols, polyglycerols (including diglycerol), erythritol, pentaerythritol, hexitols such as mannitol and sorbitol, hexitans such as mannitan and sorbitan, hexides such as mannide and sorbide, cyclitols, mono- and oligo-saccharides and the like. All of such partial esters comprise a laurate, at least as a major constituent.

Specific examples of the esters I contemplate using are ethylene glycol monolaurate, diethylene glycol monolaurate, glycerol monolaurate, mannitan monolaurate, sorbitan monolaurate, alcoholysis products of coconut oil and a polyhydroxylic material, partial esters of mixed fatty acids of coconut oil and a polyhydroxylic material.

These products can be prepared by known procedures, for example, direct high temperature reactions such as those described in connection with hexitan and hexide esters in my application Serial Number 310,351, low temperature acyl chloride reactions and others which will be apparent to those skilled in the art.

Mixed products are usually preferred to pure homogeneous products because of their ready dispersibility and wetting characteristics and their generally lower titer. The alcoholysis products have a highly desirable degree of complexity for my use.

The present invention employs material of the type just described in conjunction with known vegetable parasiticidal agents. It has been found possible in many cases to employ a combination of this type in dilutions such that neither ingredient is present in sufficient quantity to give consistent commercial kills of insects by itself and yet the combination at the same dilution is highly efficient.

The combination parasiticide of my invention is not to be confused with the conventional use of a small amount of a soap or other material as a spreader. I employ partial esters in substantial quantities such that they augment the killing power of the vegetable parasiticides. Furthermore many of these partial esters have some toxicity in and of themselves, although usually not a commercially practical toxicity at the dilutions employed. While I do not wish to limit my invention to particular dilutions of the esters, because of the very wide variation in dilutions required for control of different insects and for adaption to different spraying apparatus and techniques, it can be said that in general my esters are used at a dilution of not over 1 part in 2000 parts of water in the final spray composition. For most purposes it will be preferable to use dilutions not greater than 1 part in 1200 parts of water. The highest dilutions are useful for control of insects readily killed by the combinations of the invention and/or for use in spraying with apparatus and techniques which insure heavy and complete wetting of the insects.

Some of the described partial esters can be used also as spreaders for toxic materials in which cases they are employed in quantities just sufficient to produce the wetting and spreading characteristics desired in the usual manner of spreaders. The present invention, however, is based on the discovery that in the case of insecticides of vegetable origin the use of relatively large quantities of partial esters of this class produces a synergistic action. Example 6, part (c), illustrates the use of mannitan-coconut oil derivative as a spreader while part (a) of the same example illustrates the comparative use of the same derivative in a synergistic combination with a rotenone-containing extract.

The amount of vegetable parasiticide to be used is subject to wide variation. For reasons of economy these expensive ingredients are used in the lowest concentrations consistent with good kills. The vegetable parasiticide is used in such amount as to produce an effective synergistic action in combination with the partial esters. There are no sharply defined limits to the absolute quantities to be used, for the reason that each combination parasiticide is different and furthermore an effective concentration for one insect or for one method of application may not be suitable for a different insect or method. Rotenone, for example, in the neighborhood of 1% by weight, based on the total weight of rotenone-containing extract and partial ester, is at an effective concentration for most purposes. From about ½% to 3 or 4% can be used in various instances. Above the effective concentrations, however, there is little advantage in the use of further quantities.

The combination of a partial ester of the type described and a rotenone-containing extract has been found particularly advantageous. Such combinations at very economical dilutions have been found effective in the control of a wide variety of insects.

Combinations of the said partial esters with pyrethrum extracts or with nicotine or its salts are also highly useful. Pulverized flowers of pyrethrum which may or may not have been altered as to pyrethrin content are also useful in the combinations.

It is usually convenient to produce a readily dispersible concentrate by dissolving vegetable parasiticides such as rotenone-containing extracts and pyrethrum extracts in the partial esters. While free nicotine can be dissolved in the esters to produce stable concentrates it is preferred to keep them apart until actually making up the spray because the latter procedure has been found to produce higher toxicity. Nicotine salts can also be dissolved in the esters to form concentrates. On long standing under some conditions the nicotine salt concentrate sometimes shows signs of separating but homogeneity can be reobtained by agitation of the mixture.

The vegetable parasiticides can be used in the form of extracts of the respective plants such as are commercially available. Thus resinous extracts of derris, cube and pyrethrum are standard articles of commerce. Extracts or derivatives of other toxic plants can likewise be obtained readily.

An alternative procedure useful in certain cases is to extract the parasiticidal principal from the plant directly with the partial esters. Thus, derris and cube roots, and pyrethrum flowers can be extracted with the partial esters described. For example, mannitan-coconut oil derivative can be used to extract the toxic material from such botanical sources and the resulting concentrate either used directly to form an aqueous spray, or first adjusted in concentration by adding a further quantity of mannitan-coconut oil derivative.

It will be obvious that for the preparation of a spray the added toxic ingredient can be introduced separately into the water instead of employing a previously prepared concentrate. Wherever practical I prefer the concentrate method, however, for better incorporation of the ingredients and more accurate and facile adjustment of dilution. The concentrate also offers the substantial practical advantage of offering a single, readily dispersible combination as distinguished from the use of separately packaged ingredients which have to be measured individually to obtain the desired dilutions.

The following examples are illustrative of methods of preparing combination insecticides of the type of the invention:

*Example 1*

2 mols mannitol and 1 mol coconut oil are reacted in the presence of a small amount of sodium hydroxide as catalyst at about 200–300° C. The product comprises a large portion of mannitan monolaurate together with other esters of inner ethers derivable from mannitol and the fatty acids of coconut oil, and partial (largely mono) fatty acid glycerides. The product may also contain small amounts of unesterified polyhydroxylic material. For convenience this derivative will be referred to hereinafter as "mannitan-coconut oil derivative."

A concentrate is prepared by warming a quantity of mannitan-coconut oil derivative to 90° C. Derris root extract is then added until the concentrate contains 1% rotenone by weight. The mixture is stirred and heated until the extract is dissolved, then the product is cooled and packaged. This concentrate is referred to hereinafter as "the product of Example 1."

Example 2

Mannitan-coconut oil derivative and ground derris root are warmed together with stirring for a sufficient time to extract rotenone from the root. The produce is then filtered and the filtrate can be used directly as a dispersion in water or diluted further with mannitan-coconut oil derivative to produce a concentrate of lower rotenone content.

Example 3

A pyrethrum-containing concentrate is prepared by warming a quantity of mannitan-coconut oil derivative to about 40° C. Pyrethrum oleoresin is then added until the concentrate contains 2.2% pyrethrins by weight. The mixture is stirred and heated until the extract is dissolved, then the product is cooled and packaged.

The following examples show the results of insect control applications of the insecticides of the invention:

Example 4

The product of Example 1 was employed in the following instances with the results indicated:

| Dilutions of spray in water | Insect | Plant host | Kill |
|---|---|---|---|
| | | | Per cent |
| 1:400 | Thrips (Thrips tabaci) | Cabbages | 96 |
| 1:400 | Leafhoppers (Erythroneura comes) | Grapes | 100 |
| 1:600 | Melon Aphis (Aphis gossypii) | Cucumber | 100 |
| 1:1000 | do | do | 100 |
| 1:600 | Colorado Potato Beetle larvae (small) (Leptinotorsa decemlineata) | Potato | 98.5 |
| 1:800 | do | do | 81.9 |
| 1:800 | Hairy Chinch Bug (Blissus hirtus) | Lawn grass | 89 |
| 1:600 | Striped Cucumber Beetle (Diabrotica vittata) | Squash | 87.9 |
| 1:600 | Potato Flea Beetle (Epitrix cucumeris) | Egg plant | 95 |
| 1:1200 | do | do | 86 |
| 1:1000 | European Red Mite (Paratetranychus pilosus) | Apple trees | 93.7 |
| 1:1200 | do | do | 92.2 |
| 1:1200 | Pea Aphid (Macrosiphum pisi) | Broadbean | 98.8 |
| 1:2000 | do | do | 92.6 |

Example 5

The product of Example 1 is also effective against scale insects. One part of the combination insecticide was dispersed in 200 parts water and used as a spray on scale-infested plants with the following results:

| Insect | Plant | Kill |
|---|---|---|
| | | Per cent |
| Scale (Fiorinia fioriniae) | Camellia | 99 |
| Do | Ilex (Chinese Holly) | 99 |
| Scurfy scale (Chionaspis furfura) | York Apple Trees | 91 |

Dilutions of the same combinations down to 1 part in 400 parts water were found to give results nearly as good as the above in further tests on scale on camellia and ilex.

Example 6

(a) The product of Example 1 was dispersed in 400 parts water and sprayed on greenhouse rose plants which were infested with red spider mite (Tetranychus telarius). A kill of active stages of 99.6% was noted.

(b) Mannitan-coconut oil derivative without rotenone gave gills of 60-65% at a concentration of one part in 400 parts water under comparable circumstances.

(c) A rotenone-containing extract was dissolved in acetone to produce a solution comprising 1% rotenone. To this solution was added 5% of mannitan-coconut oil derivative as a spreader. The solution and spreader were then dispersed in 400 parts of water and sprayed on infested greenhouse rose plants as in parts (a) and (b) above. A kill of 75.7% of the active stages of red spider mite was noted. In this case the mannitan-coconut oil derivative is present in the spray as one part in about 8400 parts of water.

Example 7

(a) A spray was made up with 1 part of mannitan coconut oil derivative in 400 parts of water. To 12½ pints of the mixture 1½ oz. cube (5% rotenone) powder were added. This spray was found effective against half grown or small cabbage loopers (Autographa brassicae). The spray so prepared gave a kill of 80% in tests against this insect.

(b) For comparison a test was made using 1 part mannitan coconut oil derivative to 400 parts of water against the same insect and in two tests kills of 74% and 66% respectively were noted.

(c) To compare the effect of the rotenone alone, a spray was made up containing the same concentration of cube (5% rotenone) powder as in part (a) and containing in addition soy bean flour in the ratio of 1 lb. to 100 gallons of water. The soy bean flour is a common inert spreader used in such sprays and has of itself no insecticidal properties. This spray was used against the cabbage loopers and resulted in a kill of 66%.

Example 8

Comparative tests were run on active stages of red spider mite (Tetranychus telarius) on bean leaves by spraying the following compositions thereon:

| Material | Dilution in water | Per cent mortality |
|---|---|---|
| Glyceryl monolaurate+rotenone extract (1% rotenone in product) | 1:400 | 100 |
| Diethylene glycol monolaurate+rotenone extract (1% rotenone in product) | 1:400 | 89 |
| Ethylene glycol monolaurate+rotenone extract (1% rotenone in product) | 1:400 | 100 |
| Do | 1:800 | 92.7 |

Example 9

The product of Example 3 was sprayed on infested plants as indicated in the following table:

| Dilution in water | Insect | Plant host | Kill |
|---|---|---|---|
| | | | Per cent |
| 1:400 | Rose Chafer (Macrodactylus subspinosus) | Sprayed on ground. | 100 |
| 1:400 | Striped Cucumber Beetle (Diabrotica vittata) | Cucumber | 100 |

Example 10

Mannitan-coconut oil derivative plus pyrethrum oleoresin, the concentrate containing 2.4% pyrethrins, was sprayed on infested plants as indicated in the following table:

| Dilution in water | Insect | Plant host | Kill |
|---|---|---|---|
| | | | Per cent |
| 1:400 | Squash Bugs (small) (*Anasa tristis*). | Pumpkin vines | 95.4 |
| 1:800 | Turnip Aphid (*Rhapalosiphum pseudobrassicae*). | Cabbage | 100 |
| 1:800 | Rose Sawfly Larvae | Rose | 100 |

The invention is not to be taken as limited to the preceding examples or other details except as defined in the following claims. Many more examples of the insecticidal efficiency of the combination parasiticides of the invention could be presented but it is believed that the above examples will be sufficient to indicate to those skilled in this art the type of uses that can be made of my invention bearing in mind that many other types of insects can also be controlled through the use of my parasiticides.

I claim:

1. An insecticidal concentrate comprising a water-dispersible partial lauric acid ester of an aliphatic, low molecular weight, polyhydroxylic material, selected from the group consisting of ethylene glycol, diethylene glycol, and glycerol, said partial ester having dissolved therein a minor proportion of an insecticidal extract of a material selected from the group consisting of rotenone-containing a pyrethrin-containing vegetable matter.

2. An insecticidal concentrate, according to claim 1, in which the polyhydroxylic material is glycerol.

3. An insecticidal concentrate, according to claim 1, in which the polyhydroxylic material is glycerol and in which the insecticidal extract is an extract of rotenone-containing vegetable matter and contains rotenone in an amount such that from about ½ to about 4% of rotenone is provided in the concentrate.

4. An insecticidal concentrate, according to claim 1, in which the polyhydroxylic material is ethylene glycol.

5. An insecticidal concentrate, according to claim 1, in which the polyhydroxylic material is ethylene glycol and in which the insecticidal extract is an extract of rotenone-containing vegetable matter and contains rotenone in an amount such that from about ½ to about 4% of rotenone is provided in the concentrate.

6. An insecticidal concentrate, according to claim 1, in which the polyhydroxylic material is diethylene glycol.

7. An insecticidal concentrate, according to claim 1, in which the polyhydroxylic material is diethylene glycol and in which the insecticidal extract is an extract of rotenone-containing vegetable matter and contains rotenone in an amount such that from about ½ to about 4% of rotenone is provided in the concentrate.

KENNETH R. BROWN.

REFERENCES CITED

The following references are of record in the file of this patent:

UNITED STATES PATENTS

| Number | Name | Date |
|---|---|---|
| 1,949,798 | Knight et al. | Mar. 6, 1934 |
| 2,022,766 | Harris | Dec. 3, 1935 |
| 2,318,920 | Brown | May 11, 1943 |